United States Patent
Bodin

(10) Patent No.: US 10,888,153 B1
(45) Date of Patent: Jan. 12, 2021

(54) ORAL CARE MOUTHPIECE WITH BRUSHING ELEMENTS

(71) Applicant: Willo 32 SAS, Limoges (FR)

(72) Inventor: Antoine Michel Jean Bodin, Limoges (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/748,645

(22) Filed: Jan. 21, 2020

(51) Int. Cl.
   *A46B 9/04* (2006.01)
   *A46B 15/00* (2006.01)

(52) U.S. Cl.
   CPC .......... *A46B 9/045* (2013.01); *A46B 15/0012* (2013.01)

(58) Field of Classification Search
   CPC .................................................. A46B 9/045
   See application file for complete search history.

(56) References Cited

U.S. PATENT DOCUMENTS

| | | | |
|---|---|---|---|
| 9,636,197 B2 | 5/2017 | Khangura | |
| 9,913,992 B2 | 3/2018 | Demarest et al. | |
| 2004/0074035 A1* | 4/2004 | Huang | A46B 9/005 15/167.2 |
| 2011/0225758 A1* | 9/2011 | Chung | A46D 9/02 15/167.1 |
| 2013/0014331 A1* | 1/2013 | Garner | A46B 9/045 15/22.1 |
| 2017/0007383 A1 | 1/2017 | Blank et al. | |
| 2017/0173354 A1 | 6/2017 | Demarest et al. | |
| 2017/0367801 A1 | 12/2017 | Fitzgerald | |
| 2018/0368957 A1 | 12/2018 | Hyun | |
| 2019/0083216 A1 | 3/2019 | Blank et al. | |
| 2019/0159877 A1 | 5/2019 | Sanders | |

* cited by examiner

*Primary Examiner* — Andrew A Horton
(74) *Attorney, Agent, or Firm* — Daylight Law, P.C.

(57) ABSTRACT

This disclosure relates to oral care mouthpieces and methods of forming oral care mouthpieces. A disclosed oral care mouthpiece includes a base shaped to a dental arch. The base elastically deforms in response to pressure variations in the mouthpiece. The mouthpiece also includes a set of one or more supports attached to the base and placed to allow the base to elastically deform in response to the pressure variations in the mouthpiece. The mouthpiece also includes a set of oral care elements attached to the set of one or more supports and placed to transmit pressure to the dental arch when the base elastically deforms in response to the pressure variations in the mouthpiece.

14 Claims, 6 Drawing Sheets

ORAL CARE MOUTHPIECE WITH BRUSHING ELEMENTS

BACKGROUND OF THE INVENTION

Dental cleaning plays a significant role in impacting the overall health of an individual. Many people schedule regular visits to the dentist for check-ups and cleaning operations. Many devices have been developed over the years to achieve the purpose of oral hygiene. These devices are either electrical or non-electrical. Among the above-mentioned categories of dental cleaning devices, electric dental units have gained popularity. Some examples of electric dental units are electric toothbrushes, dental water jets and electric flosses which intend to provide cleaning results by eradicating the food remains, plaque, etc. from the spaces in between the teeth. These devices tend to require less user intervention in their operation, and some are also suitable for people with reduced mobility or people on the move for whom it is difficult to use a traditional toothbrush. However, it is necessary to provide and improve existing dental units for ensuring satisfactory cleaning results.

SUMMARY OF THE INVENTION

Specific embodiments of the present invention disclosed herein relate to the technical field of oral care appliances and methods of use thereof. In particular, specific embodiments of the present invention disclosed herein relate to oral care appliances in the form of oral care mouthpieces with a base shaped to a dental arch and a set of oral care elements which apply pressure to the dental arch when the base elastically deforms in response to pressure variations in the mouthpiece. The oral care action of the mouthpiece can therefore be achieved via the application of pressure to the dental arch as caused by these pressure variations.

The oral care mouthpiece may be used for cleaning, polishing, whitening, halitosis abatement, and in other general oral care applications. The oral care elements on the oral care mouthpiece can be optimized for one of these applications or be generally applicable to multiple applications. The oral care elements could be brushing elements used for cleaning, mildly abrasive elements used for polishing, coated elements for applying a chemical treatment, or any other kind of oral care elements. In specific applications, the mouthpiece may include oral care agents that are either applied prior to the oral care action or injected into the mouthpiece during the oral care action. The oral care agent could be: a polishing agent such as an inert abrasive; a cleaning agent such as fluoride, activated charcoal, or a fluoride-fee antibacterial composition; a halitosis treatment agent such as chlorine dioxide; or a whitening agent such as hydrogen peroxide. The active composition could also be any mixture of these kinds of agents and chemicals. The oral care elements can be optimized for the application of these oral care agents to the dental arch of the user.

The fact that the mouthpiece achieves an oral care action via elastic deformation offers specific benefits. As mentioned, in specific embodiments of the invention, the deformation of the mouthpiece can be achieved through the creation of pressure variations in the mouthpiece. The pressure variations can be created in a chamber formed between the mouthpiece and the dental arch of the user. The chamber can be formed naturally by the device as the base can be shaped to the dental arch and configured to form a seal against the gingiva of the dental arch. The pressure variations can be created by a separate system such as a liquid or gaseous pump. Regardless of how the pressure variations are formed, the elastic deformation of the base and the placement of the oral care elements on the base create superior oral care actions as compared to certain prior art approaches. Various configurations and compositions of the oral care elements that support these oral care actions are disclosed in the detailed description below. Furthermore, in specific embodiments of the invention in which oral care agents are injected and removed from the mouthpiece automatically, the fact that pressure variations create the oral care action is also beneficial because the same pressure variations can be used for the dual purpose of creating the oral care action and cycling the oral care agents and waste through the mouthpiece.

In specific embodiments of the invention, an oral care mouthpiece is provided. The oral care mouthpiece comprises a base shaped to a dental arch. The base elastically deforms in response to pressure variations in the mouthpiece. The oral care mouthpiece also comprises a set of one or more supports: (i) attached to the base; and (ii) that allow the base to elastically deform in response to the pressure variations in the mouthpiece. The oral care mouthpiece also comprises a set of oral care elements: (i) attached to the set of one or more supports; and (ii) placed to transmit pressure to the dental arch when the base elastically deforms in response to the pressure variations in the mouthpiece.

In specific embodiments of the invention, an oral care mouthpiece is provided. The oral care mouthpiece comprises an elastic base shaped to a dental arch and a set of one or more supports: (i) attached to the base; and (ii) that to allow the base to deform towards the dental arch and away from the dental arch. The oral care mouthpiece also comprises a set of oral care elements attached to the set of one or more supports and placed to transmit pressure to the dental arch when the base deforms towards the dental arch and away from the dental arch.

In specific embodiments of the invention, a method of forming an oral care mouthpiece is provided. The method comprises shaping an elastic base to a dental arch, attaching a set of at least one supports to the base, and attaching a set of oral care elements to the at least one support. The set of oral care elements are placed to transmit pressure to the dental arch when the base elastically deforms in response to pressure variations in the mouthpiece.

DETAILED DESCRIPTION OF THE PREFERRED EMBODIMENT

Aspects of the present invention can be understood by reference to the figures and description set forth herein. However, the following descriptions, and numerous specific details thereof, are given by way of illustration and not of limitation. Many changes and modifications to the specific descriptions may be made without departing from the scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

Aspects of specific embodiments of the present invention will be presented by describing various embodiments using specific examples and represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

Figure 1:
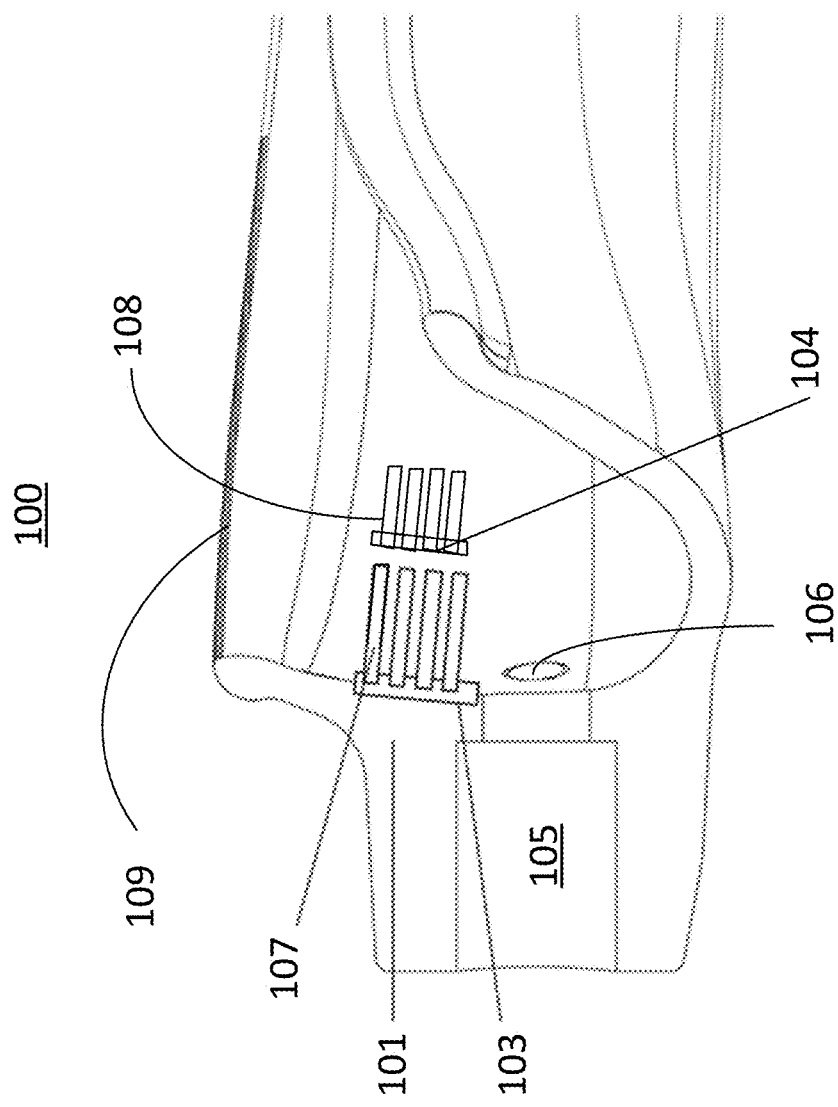
FIG. 1 illustrates a cross section view of an oral care mouthpiece and a flow chart for methods of fabricating an oral care mouthpiece in accordance with specific embodiments of the present invention.
Figure 1:
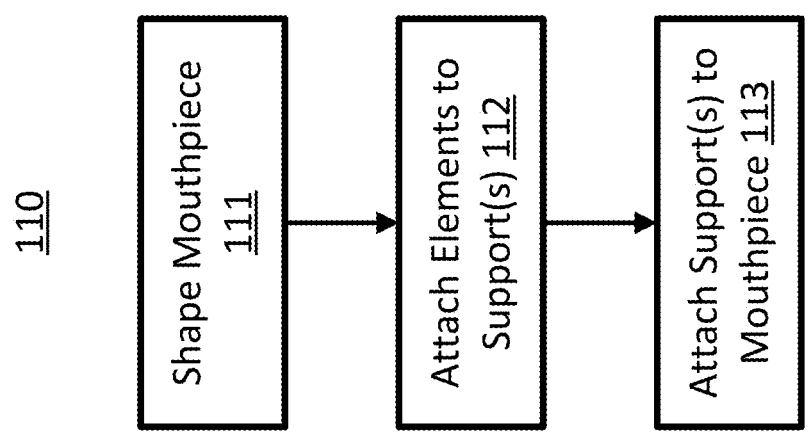

FIG. 1 illustrates a cross section view of an oral care mouthpiece 100 in accordance with specific embodiments of the present invention. Oral care mouthpiece 100 includes a base 101 shaped to a dental arch. The base 101 can elastically deform in response to pressure variations in the mouthpiece 100. The term elastic is used herein to refer to a property of a material which allows it to deform in response to an applied force and then return to its original shape when that force is removed. In the illustrated case, the pressure variations can be caused in a chamber formed by base 101 pressing against the dental arch, and the pressure variations are formed by pulling air or liquid out of that chamber via port 106 as connected to conduit 105. The mouthpiece can have a bumper 109 with a different composition (e.g., softer) than the remainder of base 101 in order to form a comfortable seal with the dental arch. In the illustrated case, the base 101 can be formed of moulded plastic, rubber, silicon, or other elastic material. In specific embodiments of the invention, the base can be an elastic base shaped to the dental arch.

In specific embodiments of the invention, the mouthpiece can take on various shapes. The mouthpiece could be shaped to cover at least a portion of the gingiva of the user's mouth and allow the brushing elements on the mouthpiece to lie in proximity to the teeth. The base can be shaped to a dental arch in that it covers a single full arch of a user's teeth (e.g., the top or the bottom). The base could be part of a set in which one part of the set was shaped to the top dental arch of a user while the second part of the set was shaped to the bottom dental arch of the user. Alternatively, the base could be reversible and could be applied to both the top and bottom arches at different times. The base could be part of a set in which one part of the set was shaped for each quarter of the dental arch of a user, while the other three parts of the set were shaped for the remaining portions of the dental arch of the user. The base could be part of a set in which one part of the set was shaped for counter quarters of the dental arch of a user, while a second part of the set was shaped for the alternative two counter quarters of the dental arch of the user. Alternatively, the base could be reversible and rotatable such that it could be applied to the four different quarters of the dental arch at different times. The base could also be a single element capable of covering both the top and bottom dental arch of the users at a single time.

FIG. 1 also includes a flow chart 110 which represents a wide array of methods for forming an oral care mouthpiece. In specific embodiments of the invention represented by flow chart 110, the method can be used to form an oral care mouthpiece such as mouthpiece 100. Flow chart 110 includes a step 111 of shaping an elastic base to a dental arch. The elastic base could be base 101. Step 111 can be conducted using an injection or stamp mould, additive manufacturing techniques such as three-dimensional printing, or any other manufacturing process for elastic items.

FIG. 1 also includes a support 103 attached to base 101. The support 103 is in turn attached to a set of oral care elements 107. As illustrated, support 103 is partially embedded in base 101 and has been attached by either adhesive attachment, over-moulding or any other suitable bonding process. Base 101 also includes a second attached support 104 with an attached set of oral care elements 108. A set of two supports is shown for illustrative purposes, but oral care mouthpieces in accordance with this disclosure can include a set of one or more supports including one support (e.g. a "flat skeleton"), three supports, ten supports, or dozens of supports. As illustrated, each support in the set of supports includes attached oral care elements from the set of oral care elements. The oral care elements 107 can apply pressure to the dental arch of the user when the mouthpiece 100 elastically deforms. For example, the oral care elements 107 can conduct a brushing action against the dental arch of the user when the mouthpiece 100 elastically deforms in response to pressure variations generated in a chamber formed between the dental arch and the mouthpiece by the removal or injection of air or liquid from outlet 106.

In specific embodiments of the invention, a set of one or more supports attached to a base of an oral care mouthpiece allow the base to deform, such as in response to pressure variations in the mouthpiece. The set of supports can be positioned to enable the base to deform and/or the composition of the supports can be such that the base is enabled to deform along with the support. For example, the supports could be independent rigid elements distributed through the mouthpiece such that they do not constrict the ability of the base to deform, or the support could be a single elastic element attached to the mouthpiece that does not constrict the ability of the base to deform. The set of supports can allow the base to deform toward the dental arch and away from the dental arch. Deformation towards and away from the dental arch could contribute to an oral care action against the dental arch.

In FIG. 1, the illustrated supports are rigid elements, but the set is not contiguous and is distributed through the mouthpiece. As such, they have been placed to allow the base 101 to elastically deform in response to pressure variations in the mouthpiece (e.g., pressure variations caused by the removal or addition of fluid or air through port 106). Various alternative approaches for placing the supports to allow the base to elastically deform in response to pressure variations are disclosed below. The constraints on the placement of the supports to achieve this objective are set by the characteristics of the supports themselves, the characteristics of the oral care elements attached to the supports, and the oral care action the oral care mouthpiece is designed for.

In specific embodiments of the invention, a set of oral care elements attached to a set of one or more supports in an oral care mouthpiece are placed to transmit pressure to the dental arch when the base elastically deforms in response to the pressure variations in the mouthpiece. The set of oral care elements can be placed to transmit pressure to the dental arch when the base deforms towards the dental arch and away from the dental arch. In FIG. 1, the oral care elements are placed on the supports in a direction facing the dental arch and will conduct a brushing action against the dental arch as the mouthpiece elastically deforms. The brushing action will be towards the dental arch and down away from the gingiva of the dental arch. In specific embodiments of the invention, the oral care elements can be placed at various angles to increase or decrease the pressure applied against the dental arch during the oral care action. Furthermore, in specific embodiments of the invention, large number of widely distributed oral care elements will be included in the mouthpiece such that the entire dental arch located within the ambit of the mouthpiece is subjected to an oral care action simultaneously. In other specific embodiments, dedicated sets of oral care elements are placed in the oral care mouthpiece so that their action is directed toward the gingiva of the dental arch thus providing a specific oral care action in this particular area.

FIG. 1 also includes a step 112 of attaching a set of oral care elements to the at least one support. The oral care elements can be attached to the supports in various ways. Various approaches for conducting this step are discussed below and include weaving the ends of the oral care elements into a canvas of woven fibres that form the support for the oral care element. Additional approaches that can be used in the alternative or in combination include the use of a twisted wire, adhesives, sonic welding, fusing, moulding, stapling, gluing, additive manufacturing, and other methods for attaching structures or forming attached structures.

FIG. 1 also includes a step 113 of attaching a set of at least one supports to the base. The supports can be attached in various ways including injection moulding, over-moulding, fusing, sonic welding, clipping, sewing, stapling, pinning, or using one or more adhesives. As illustrated, support 103 has been attached to base 101 using either over-moulding or adhesive attachment into a recess in the base. The recess can be part of a negative for the support structure. The recess can be formed when the base was originally shaped or as an additional manufacturing step prior to attaching the supports. The set of supports can allow the base to elastically deform, such as in response to pressure variations in the mouthpiece. Step 113 can be conducted such that the set of one or more supports are placed to allow the base to elastically deform, such as in response to pressure variations in the mouthpiece (e.g., rigid support elements distributed through the mouthpiece). Alternatively, the composition of the support itself can be selected to allow the base to elastically deform, such as in response to those pressure variations.

In specific embodiments of the invention, the oral care elements and/or the supports can be connected temporarily and be detachable. The state of being easily attached, but detachable by an end user without specialized tools can be referred to as being detachably attached. The oral care elements and/or the supports can be detachably attached using clips, interlocking into a channel (e.g., dovetail rail), velcro surfaces, vacuum, screws, snaps, magnets, or any other form of detachable connection. In specific embodiments of the invention, the mouthpiece can include a support in the form of a rail or platform which presents specific holding features such as channels, stops, pins, holes, clipping features, guides etc. In these embodiments, the oral care elements could be mounted on a connecting element that could be easily attached to and removed from the rail or platform of the mouthpiece without tools (e.g., by clipping, sliding, screwed, snapping, magnetizing, etc.).

The oral care elements and/or the supports could be detachably attached for different reasons depending upon the embodiment. For example, the mouthpiece, oral care elements, and/or supports could have different expected usable life cycles, with the mouthpiece expected to last longer, such that new supports and/or oral care elements could be swapped using the detachable connection. This solution would reduce the cost of the mouthpiece as the oral care elements, once worn, could be renewed without throwing away the whole membrane. As another example, a single mouthpiece base could be configured to accept different supports or oral care elements; or a single support could be configured to accept different oral care elements. In other words, the base or supports could be general purpose elements allowing for different kinds of oral care to be achieved by the same oral care mouthpiece by swapping out the oral care elements. Detachable attachment of the oral care elements would also allow a user to alter the characteristics of the oral care elements in their oral care mouthpiece to suit their immediate needs (e.g., various materials, stiffness, distribution, etc.).

Steps 112 and 113 in flow chart 110 can be executed so that the set of oral care elements are placed to transmit pressure to the dental arch when the base elastically deforms in response to pressure variations in the mouthpiece. The oral care elements can be configured to have thin contact zones with the dental arch. The oral care elements can be configured to have tips contact the dental arch. In embodiments in which the oral care elements include a coating, the oral care elements can be configured to have their sides contact the dental arch.

The steps of flow chart 110 can be conducted in differing chronological orders depending upon the overall structure of the oral care mouthpiece. Although step 111 is illustrated as the first step in flow chart 110, the interrelationship of the three illustrated steps in the flow chart 110 can vary significantly based on the overall structure of the oral care mouthpiece. For example, step 112 could be conducted before step 111 in situations in which the supports and base are independent elements that are separately formed and are later attached. As another example, step 113 could be conducted prior to step 112 in situations in which the support and base are formed using a continuous process (e.g., by over-moulding) and the oral care elements are later attached to the supports (e.g., by clipping onto the supports). Numerous additional variants are described in more detail below.

In specific embodiments of the invention, the oral care elements will exhibit various compositions and configurations to achieve a given oral care action. If the oral care action were a cleaning or polishing action, the set of oral care elements could be a set of cleaning elements. For example, the set of cleaning elements could comprise dental nylon bristles. If the oral care elements are attached to an elastic membrane and apply pressure against the dental arch when the membrane deforms, the oral care elements can exhibit specific characteristics for an optimized oral care action.

In specific embodiments, the oral care elements can be between 3 mm and 6 mm long, have a minimum cross section diameter of greater than 0.1 mm, have a maximum cross section diameter of less than 0.2 mm, and have a Young's modulus between 2,000 MPa and 5,000 MPa. The maximum cross section can be measured at the largest cross section of the oral care element measured in a plane with a normal vector in the direction the oral care element extends away from the base. In specific embodiments, the oral care elements have a resisting moment less than $10^{-4}$ Newton meters. The resisting moment is defined as the Young's modulus in MPa multiplied by the quadratic moment of a minimum cross section of the oral care element in meters to the power of four, divided by the length of the oral care element. The minimum cross section can be measured at the smallest cross section as measured in a plane having the same normal vector as the one described above with reference to the maximum cross section.

In specific embodiments of the invention, the oral care elements will be bristles having varying shapes depending upon the embodiment. The bristles can have a disk cross section. However, the bristle can have alternative symmetrical, asymmetrical, and irregular cross sections. The cross sections of the bristles may be of varying sizes. Additionally, a single embodiment may utilize bristles having varying sizes and cross sections. In specific embodiments, the cross section of the bristles could include one or more sharp edges along its length (section with one or more sharp angles), resulting in an improved disruption of the dental plaque, and more generally an improved efficiency of the oral care treatment (e.g. teeth cleaning or teeth whitening). In another specific embodiment the surface of the bristles is modified by a surface treatment such as spraying, chemical coating, surface hardening, surface ionization or any other surface treatment. Such modifications would enhance the bristles specific oral care action. In yet another specific embodiment the material composition of the bristles can contain specific elements to enhance its oral care action.

In specific embodiments of the invention, the supports that are attached to the base of the oral care appliance can take on various forms. The characteristics of the support selected for a given design affects the characteristics of the oral care elements and the base in that it is attached to both. As such, the characteristics of the supports can have an impact on all the steps in flow chart 110. Specific examples of supports for different embodiments are described below. The set of one or more supports can be a set of flexible pads, a canvas of woven fibres, a twisted wire assembly, a flat elastic skeleton, a set of rigid elements, and/or a support rail or platform. Each of the aforementioned sets can have a cardinality of one or more. The supports can further be attached to the base using various methods. For example, each support in the set of one or more supports which are attached to the base of the oral care mouthpiece can be attached using one of mounting glue, mounting resin, mounting clips, over-moulding, or a heat treatment.

Figure 2:
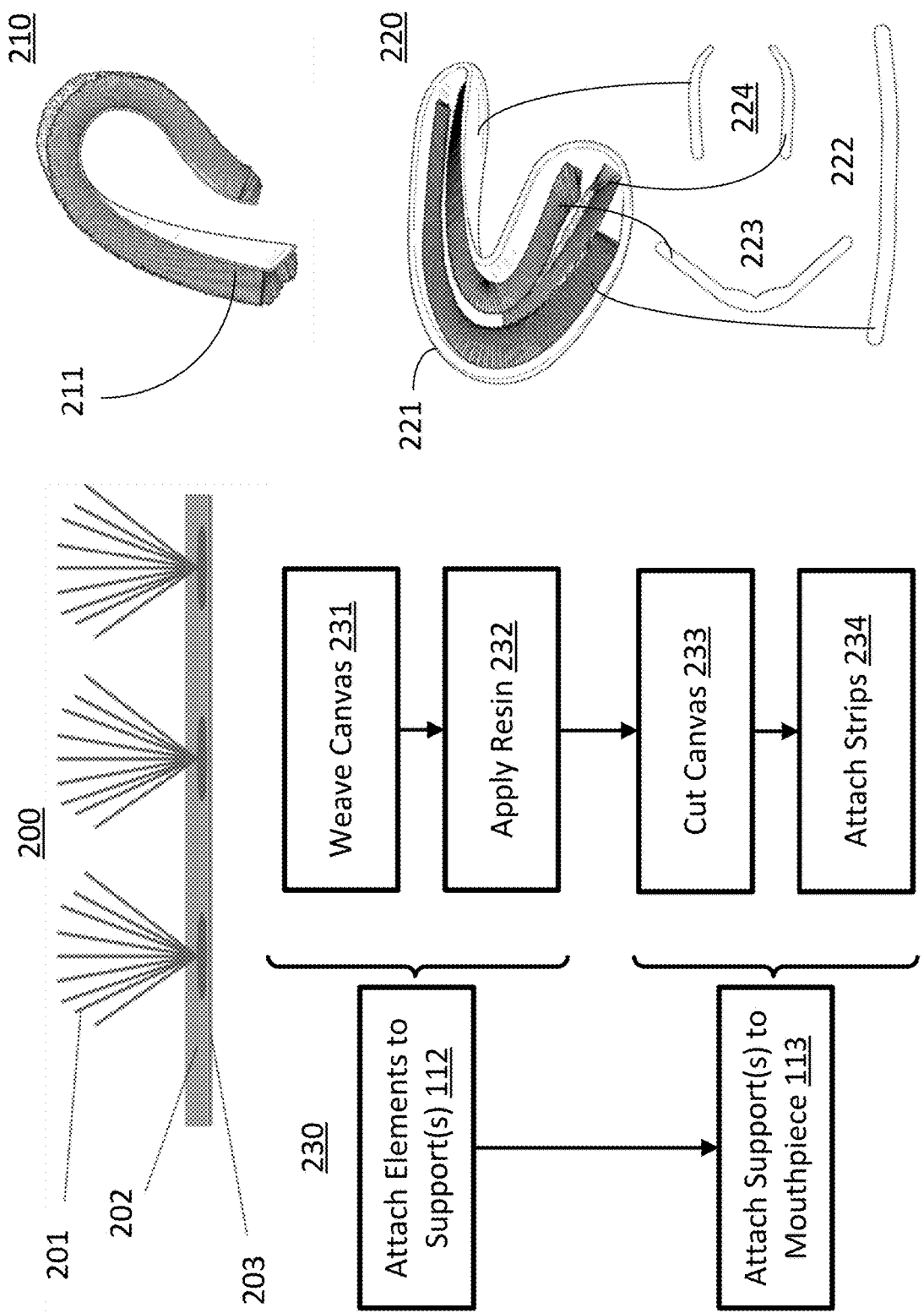
FIG. 2 illustrates a cross section of a support element for an oral care element in the form of a flexible pad, an illustration of a flexible pad, an illustration of an oral care mouthpiece fabricated using that flexible pad, and a flow chart for a set of methods for fabricating an oral care mouthpiece with a flexible pad in accordance with specific embodiments of the present invention.

FIG. 2 illustrates a cross section 200 of a support element for an oral care element in the form of a flexible pad, an illustration 210 of a flexible pad 211, an illustration 220 of an oral care mouthpiece 221 fabricated using that flexible pad, and a flow chart 230 for fabricating an oral care mouthpiece with a flexible pad in accordance with specific embodiments of the present invention. In the illustrated case, the flexible pad 211 is a canvas of woven fibres. However, in alternative embodiments of the invention, the flexible pad can take on various forms including any supple or flexible strip or pad of material (e.g., rubber strips, silicon pads, etc.) that are adapted to hold oral care elements such as bristles. In the illustrated case, the flexible pad 211 is cut into strips, such as strip 222, and applied to the full lateral extent of the oral care mouthpiece 221 as shown in image 220. However, in alternative embodiments of the invention, the pads can be directly attached without first being cut into strips. Furthermore, the pads can be oriented in different ways relative to the dental arch and can be relatively smaller pieces that do not extend over a full lateral or vertical extent of the oral care mouthpiece.

The support element in cross section 200 is a woven canvas which includes a flexible substrate 202 of woven fibres. Cross section 200 can correspond to a portion of flexible pad 211 in image 210. In specific embodiments of the invention, the fibres can be polyester or any other biocompatible material capable of being weaved. Cross section 200 also includes a set of oral care elements in the form of bristles 201. In specific embodiments of the invention, the bristles can be dental nylon or any other material that allows the oral care elements to exhibit the characteristics described above when appropriately placed and shaped. Cross section 200 also includes a layer of flexible biocompatible resin 203 applied to the back of the flexile woven canvas. The resin can both assure that the oral care elements remain attached to the support and assist with attaching the support element to the oral care appliance. The flexible woven canvas can be attached to the oral care mouthpiece and provides support for the oral care elements while not impeding the ability of the oral care mouthpiece to deform in order to conduct an oral care action.

In a specific embodiment of the invention, the resin 203 is applied to the back of the flexible woven canvas. The canvas is then applied on the oral care appliance and the resin ensures the bounding between the membrane of the oral care appliance and the canvas. This resin 203 can act like a simple gluing solution or can be activated by UV lights exposition, air suction, specific reactive, temperature input or any other activation process.

In FIG. 2, the flexible strip 222 is one of four flexible pads that have been attached to oral care mouthpiece 221. These strips include a back edge strip 223 and two bottom strips 224. The flexible pads are each supports in a set of supports that allow the mouthpiece to deform in response to pressure variations. Each flexible pad can have the characteristics of cross section 200. As such, each support in the set of one or more supports comprises a canvas of woven fibres and a flexible and biocompatible resin on a back of the canvas. The oral care elements are attached to the support by being woven into the canvas and held in place by the resin.

In specific embodiments of the invention, oral care elements can be attached to a flexible pad in various ways. Flow chart 230 includes implementations of step 112 from FIG. 1 that are applicable to support elements in the form of flexible strips or pads. Flow chart 230 includes implementations that are applicable to support elements in the form of woven canvases. Flow chart 230 includes an implementation of step 112 in which the set of oral care elements are attached to at least one support which includes steps 231 and 232. Step 231 is a step of weaving a canvas of fibres. The canvas can be canvas 202, the oral care elements can be bristles 201.

Step 232 is a step of applying a layer of flexible biocompatible resin on the back of the canvas. Step 232 can be conducted such that the resin covers the base of the oral care elements to thereby further secure the oral care elements in the canvas.

The execution of step 231 can impact the configuration of the oral care elements in the oral care mouthpiece. By changing the parameters of the canvas (e.g., the mesh, the fibre diameter, the number of oral care elements inserted at once, etc.) it is possible to monitor the oral care element density. In specific embodiments of the invention, the oral care elements, such as nylon bristles, can be gathered in tufts before being integrated in the canvas. Gathering the elements into tufts can increase the density of the oral care elements and increase the strength of the bond between the canvas and oral care elements.

In specific embodiments of the invention, a support in the form of a flexible pad can be attached to an oral care appliance in various ways. The flexible pad can be attached to the oral care appliance using adhesives, fusing, over-moulding, detachable mounting features such as clips, etc. The flexible pad could be attached using insert moulding techniques. For example, the substrate of the pad could be inserted on the central part of the mould followed by the formation of the oral care mouthpiece base using the mould. The attaching of the pad to the oral care appliance could occur before or after the attaching of the oral care elements to the pad. In examples in which the oral care elements are pre-attached, and the flexible pad is attached using an over-mould of the base, the oral care elements could be sheathed in a metal portion of the mould or protected inside a block of wax that is removed after the demoulding. Regardless of whether the oral care elements are attached to the support first, the pad can be cut into strips prior to being attached to the oral care mouthpiece.

Flow chart 230 includes implementations of steps 113 from FIG. 1 that are applicable to support elements in the form of flexible strips or pads. Flow chart 230 includes implementations that are applicable to support elements in the form of woven canvases. Flow chart 230 includes an implementation of step 113 in which the support is attached to the mouthpiece which includes steps 233 and 234. Step 233 is a step of cutting the canvas into strips. The canvas can be canvas 202 and the canvas can be cut into three or more strips that are each the entire lateral length of the mouthpiece base. However, the canvas can be cut to form strips of any size in accordance with the requirements of their placement on the mouthpiece as described above. Step 234 is a step of attaching the strips to the mouthpiece base. The step can involve attaching the strips to negatives formed in the mouthpiece base or to any surface of the mouthpiece. The strips can be secured using a supple biocompatible adhesive. In specific embodiments of the invention, the step can be conducted using the same biocompatible resin used to keep the oral care elements attached to the support, such as resin 203. Each support in the set of one or more supports can be attached to the base using the flexible and biocompatible resin which was used to hold the oral care elements in place on the support.

In specific embodiments of the invention, the one or more supports attached to the oral care mouthpiece will be one or more twisted wires. The twisted wires could be thin to assure that they do not interfere with the deformation of the mouthpiece. The twisted wire could be two spun wires as are used in the oral care industry. The twisted wire could serve as a substrate for a set of oral care elements. The set of oral care elements could be attached to the wire by being inserted into the twisted wire. In the case of spun wires, the oral care elements could be inserted between the wires before they are twisted together. The oral care elements could be rigid bristles of nylon or a thermoplastic elastomer (TPE). The wires could be thin plastic or metal wires.

In specific embodiments of the invention, the oral care element density can be controlled in various ways. For example, the density of the oral care elements can be modified by modifying the fabrication parameters for attaching the oral care elements such as the spinning angle of the wire or the density of oral care element insertion (e.g., tuft insertion). As another example, the oral care elements can be folded after they have been attached to increase the density of the brush with respect to a given arc relative to the wire. In specific embodiments of the invention, the oral care elements can be distributed around the wire and can then be folded so that the oral care elements have a distribution of 135 degrees or less relative to the twisted wire. In particular, half or more of the oral care elements can be folded towards a unique direction thereby reducing the angle of the structure from 360 degrees to 180 degrees or less thereby increasing the density of the oral care elements towards the dental arch. This approach can be applied in situations in which the wire will be attached or embedded within a surface of the oral care mouthpiece and will only face the dental arch in a limited arc while being originally fabricated to apply a brushing action in any direction.

Figure 3:
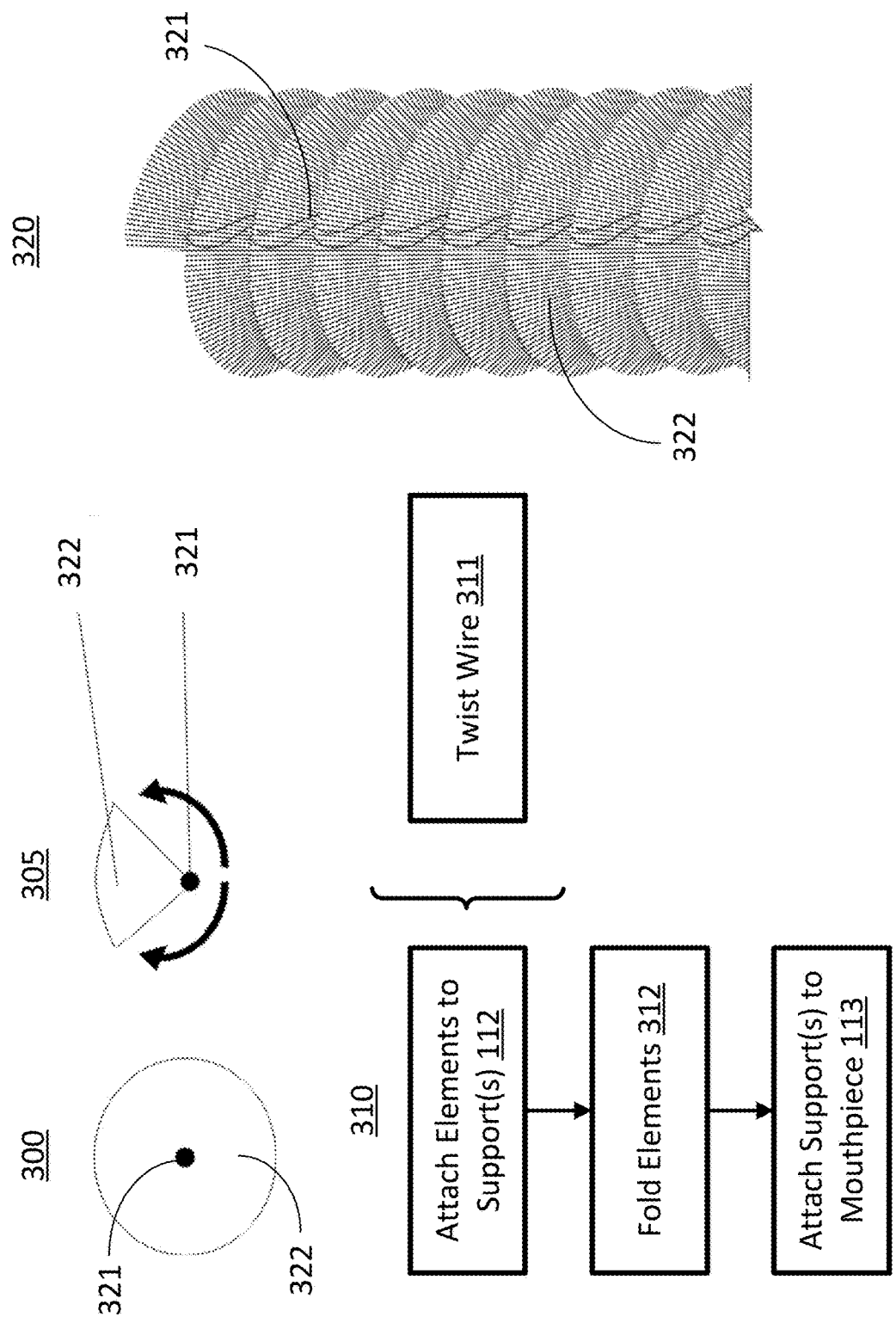
FIG. 3 illustrates two cross sections of a support element for an oral care element in the form of a twisted wire, an illustration of a twisted wire in accordance with the first cross section, and a flow chart for a set of methods for fabricating an oral care mouthpiece with a flexible pad in accordance with specific embodiments of the present invention.

FIG. 3 illustrates two cross sections 300 and 305 of a support element for an oral care element in the form of a twisted wire, an illustration 320 of a twisted wire 321 in accordance with the first cross section 300, and a flow chart 310 for a set of methods of fabricating an oral care mouthpiece with a flexible pad in accordance with specific embodiments of the present invention. In the illustrated case, the twisted wire 321 is a plastic wire which has been spun around a set of dental nylon bristles 322. However, in alternative embodiments of the invention, the dental nylon bristles 322 can be replaced with different oral care elements and the wire could be a metal wire.

Flow chart 310 includes a step 311 of twisting a set of oral care elements into a twisted wire assembly. Step 311 can be an implementation of step 112 from FIG. 1. Flow chart 310 also includes a step 312 of folding the oral care elements towards a center of the oral care mouthpiece. The step can include folding the oral care elements so that the oral care elements have a distribution of 180 degrees or less or 135 degrees or less relative to the twisted wire. For example, as shown in cross sections 300 and 305, a set of oral care elements 322 in the form of low density bristles that have been twisted with a wire assembly 321, are folded such that they have a distribution of 135 degrees or less relative to the twisted wire. The elements can be folded towards a center of the mouthpiece. As illustrated, the oral care elements are folded such that they have a distribution of 90 degrees.

Flow chart 310 continues with a step 113 of attaching the wire assembly to the mouthpiece. Step 113 in flow chart 310 can be executed in numerous ways. Step 113 can include trimming the wire at various points to size the support for insertion into the mouthpiece. As with alternative supports, the supports can have various sizes and be inserted according to different patterns. For example, multiple wire assemblies, such as three wire assemblies, could be inserted to extend along the full lateral extent of the mouthpiece. Alternative configurations are possible so long as the mouthpiece is able to deform and the oral care elements on the support achieve an oral care action during that deformation.

In specific embodiments of the invention, wire assemblies can be attached to a base in various ways. For example, the wire assemblies can be attached using any of the methods discussed above with reference to attaching a support to a base. In specific embodiments of the invention, the wires can be directly glued onto the mouthpiece membrane. In specific embodiments of the invention, the wire assembly can be directly over-moulded while the mouthpiece is casted using insert moulding process. In these embodiments, if the oral care elements have already been applied to the wire prior to over-moulding, to prevent the material from flowing through the oral care elements, the oral care elements can be either isolated inside the metal mould or protected inside a block of wax, foam, plastic film, metal cap or any other protective material that is removed after the demoulding. In specific embodiments of the invention, the wire assemblies can be attached to a rail formed on the base of the oral care mouthpiece.

As mentioned previously, in specific embodiments of the invention, the support can be a rail or platform for detachably attaching oral care elements. In specific embodiments of the invention, various supports mentioned herein such as a wire assembly, can also be attached to the base using such a rail or platform. The combined support and rail can be conceptualized as a single support in accordance with this disclosure. In specific embodiments of the invention, a first anchor portion of a rail is over-moulded inside the base. For example, the anchor portion can be over-moulded using insert moulding techniques. The rail can be attached to the mould prior to injection using a holding feature of the rail. The rail can include holes so that material bridges are created between the base and the rail. The mouthpiece can then be de-moulded and it will contain the anchor portion of the rail within the confines of the base. Oral care elements or additional supports, such as the wire assemblies mentioned above, can then be inserted into the rail to attach them to the mouthpiece.

Figure 4:
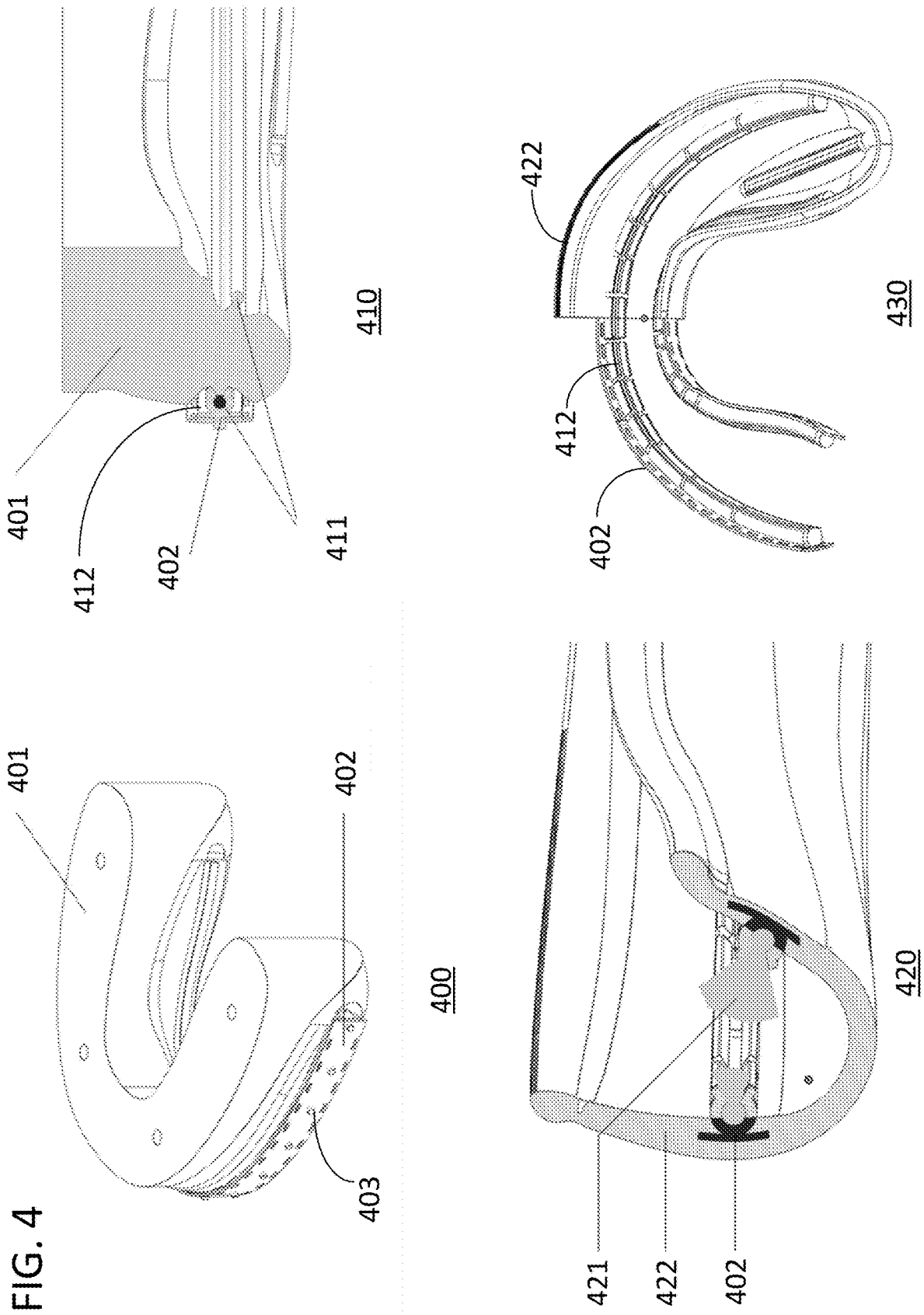
FIG. 4 illustrates an oral care mouthpiece at two stages of a fabrication process and two accompanying cross sections that are in accordance with specific embodiments of the invention disclosed herein.

FIG. 4 illustrates an oral care mouthpiece at two stages of a fabrication process and two accompanying cross sections that are in accordance with specific embodiments of the invention disclosed herein. View 400 shows the oral care mouthpiece prior to the mouthpiece being moulded. Core insert 401 is the core insert of the mould that will be used to form the mouthpiece. View 400 also shows anchor portion 402 of the rail, which will end up being inside the base of the oral care mouthpiece when fabrication is complete. Cross sectional view 410 shows the oral care mouthpiece at the same stage of fabrication as view 400. The cross-section view shows how anchor portion 402 is kept in contact with the core insert 401 via a holding feature 411 of the core insert mould 401. The views also show how there are holes 412 and 403 to allow material to flow in and around the anchor portion 402 during injection. Cross section view 420 and view 430 show the mouthpiece at a second stage of production. The base 422 of the mouthpiece has been formed via injection moulding and anchor portion 402 is within the confines of the base. Cross section view 420 also shows how oral care elements 421 can be attached to the rail, such as by sliding a wire assembly down the channel or clipping the wire assembly to the rail View 420 only includes the base 422 on half of the view in order to reveal anchor portion 402.

Figure 5:
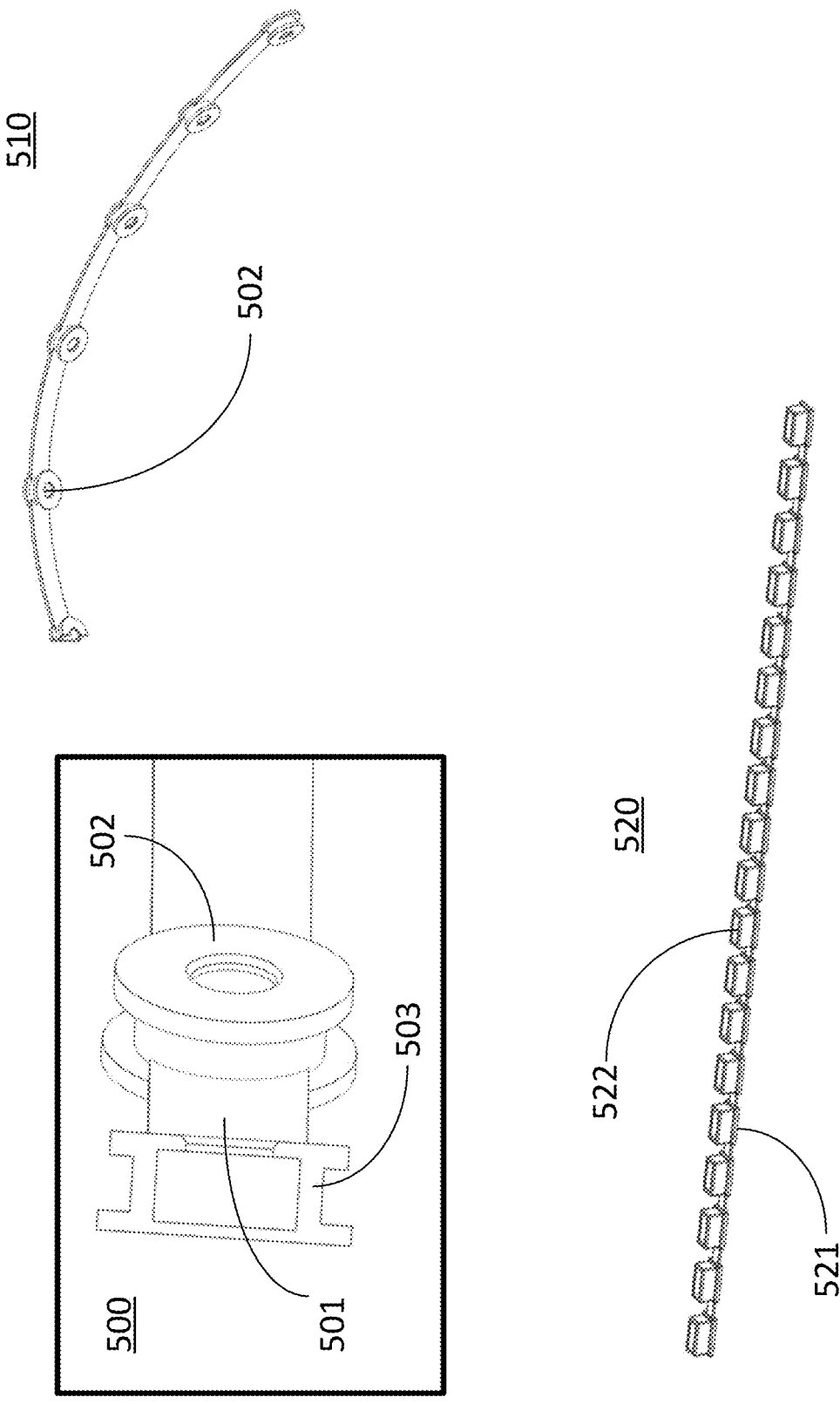
FIG. 5 illustrates two rails specialized for different oral care elements in accordance with specific embodiments of the present invention.

The rail solution can be extended to many different oral care solutions by adapting the geometry of the rail. FIG. 5 illustrates two rails specialized for different oral care elements in accordance with specific embodiments of the present invention. FIG. 5 includes a rail 510 with a set of round clips, such as clip 502. Clip 502 is shown in detail in window 500 which shows the clip attached to the line 501 of the rail which is in turn attached to the base via support 503. As illustrated, clip 502 can be used to insert round nylon or TPE tufts onto the mouthpiece. FIG. 5 also includes a rail 520 with similar characteristics in that a set of clips, such as clip 522, are connected to the main line 521 of the rail. However, clip 522 is dedicated to the integration of dense rectangular nylon/TPE tufts onto the mouthpiece. The same type of clip can be used to support oral care elements with widely varying characteristics. Altering the geometry of the rail and clips can provide numerous opportunities for altering the characteristics of the mouthpiece and its oral care action. The clips can be used to swap in new oral care elements. In embodiments in which the clips themselves are also detachably attached, the characteristics of the action of the mouthpiece can be further modified. Furthermore, the fact that the clips allow for oral care elements to be detachably attached provides the improvements in cost mentioned above associated with mouthpiece bases that have a longer life cycle than the oral care elements.

In specific embodiments of the invention, the support is a flat flexible skeleton. The flexible skeleton can include oral care elements attached to the skeleton through over-moulding, or from being part of the same mould. The oral care elements can also be attached to the flat skeleton using an adhesive, heat treatment, sonic welding, or any of the methods mentioned herein. A flat skeleton can, in certain embodiments, present certain benefits in that the demoulding axis will be aligned with the oral care elements formed thereon, allowing for finer dimensions and an improved oral care action in the finished product.

Figure 6:
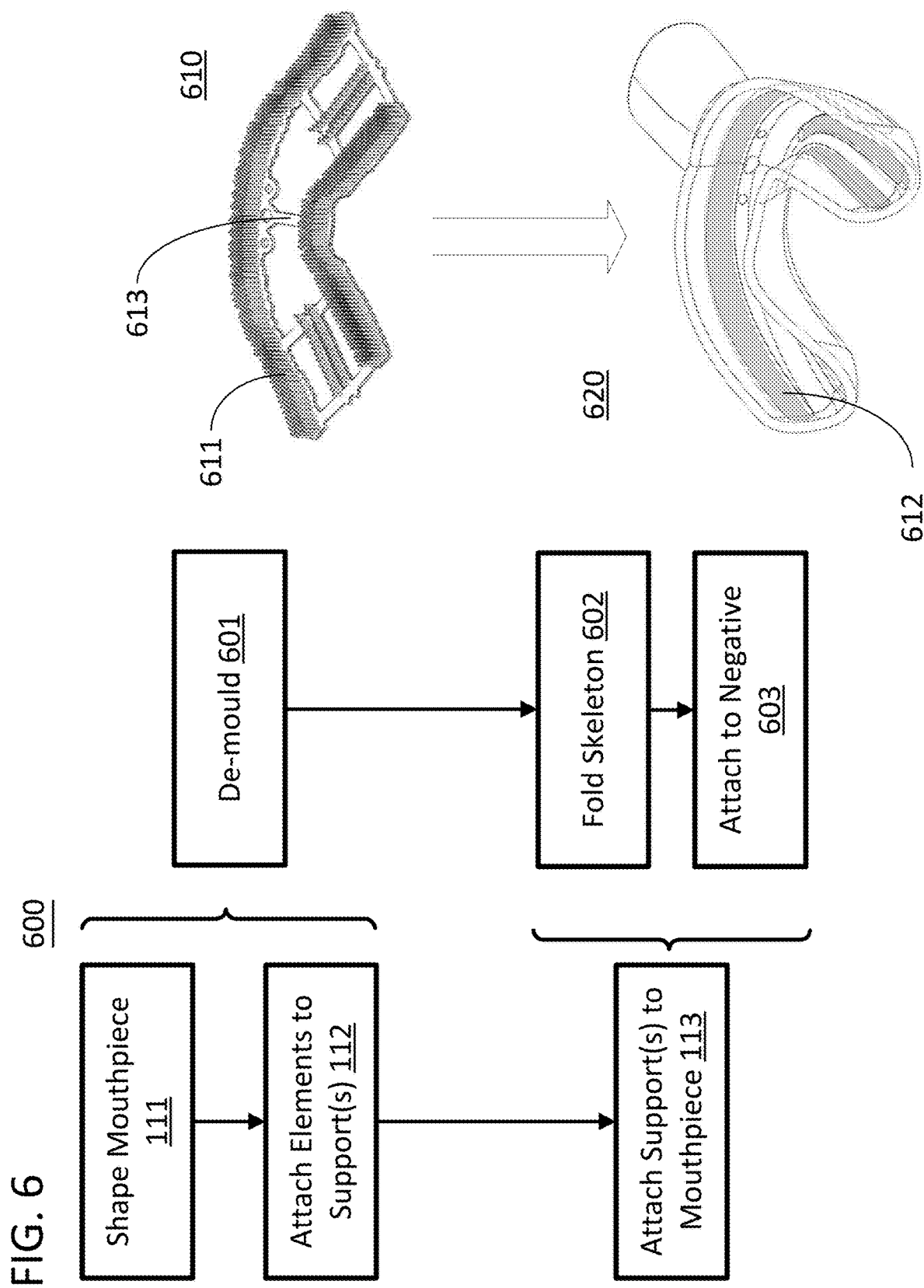
FIG. 6 illustrates a support element for an oral care element in the form of a flexible skeleton being attached to an oral care mouthpiece and a flow chart for a set of methods for fabricating on oral care mouthpiece with such a support element in accordance with specific embodiments of the present invention.

FIG. 6 illustrates a support element for an oral care element in the form of a flat flexible skeleton 610 being attached to an oral care mouthpiece 620. The oral care mouthpiece 620 includes a negative 612 into which the flexible skeleton 610 can be placed. The flexible skeleton 610 includes a set of oral care elements in the form of bristles 611 moulded with the skeleton. In specific embodiments of the invention, to simplify handling and fabrication, the skeleton can include bridges to join separate segments. As illustrated, flexible skeleton 610, includes bridges 613 between the different regions of the skeleton which maintain skeleton 610 as a single piece but does not limit the deformation of the mouthpiece when the skeleton is attached to the base. The bridges can be thinner material than the remainder of the skeleton and, in embodiments in which the mouthpiece includes a negative to receive the skeleton, the negative does not necessarily include regions to receive the bridges.

Flow chart 600 includes an implementation of steps 111 and 112 in the form of step 601 in which the skeleton is demoulded. In these embodiments, the oral care elements and support are co-moulded and they are attached as soon as the mouthpiece is formed. As the skeleton is flat, the oral care elements can be fabricated with small cross sections and the process avoids the limitations of manufacturing for complex three-dimensional geometries. Step 601 can include moulding a flat skeleton on which the bristles are attached. The mould can be drilled with high accuracy, thinness, and ease or demoulding since it is a flat part. The flat skeleton also decreases the likelihood that bristles will be torn during demoulding.

Flow chart 600 also includes an implementation of steps 113 in the form of steps 602 and 603 in which the skeleton is folded and then attached to the base of the oral care element. This process is illustrated by the arrow connecting flat skeleton 610 and base 620. The illustrated approach uses a negative 612. However, a negative is not required and the skeleton can instead be attached at a targeted location directly onto a surface of a base. The skeleton and base can be connected using any of the approaches described above for connecting a support to an oral care mouthpiece base. For example, the skeleton can be connected using sonic welding, fusing, gluing, or stapling.

In specific embodiments of the invention, the supports will be a set of rigid elements. The rigid elements can be formed on or in the base. The rigid elements can be attached to the base using glue or over-moulding. For example, the rigid elements can be held in place by the mould while the base is formed around them. The rigid elements can be independent and spaced apart such that they do not limit the deformation of the mouthpiece. In specific embodiments of the invention, the manner in which the oral care elements are attached to the rigid elements is similar to how bristles are attached to the rigid head of a standard toothbrush, but the rigid elements are each smaller than those elements in order to not impede the deformation of the base. In these embodiments, the dental care elements can be TPE, silicone, nylon, or other suitable materials. The rigid elements can be short rigid rods. The oral care elements can be stapled on the short rigid rods. The rods can be linked to the inner side of the oral care mouthpiece by any suitable assembly solution such as gluing or over moulding, or any of the approaches disclosed herein for attaching supports to a base. In specific embodiments of the invention, the rods are short and independent such that they do not limit the mouthpiece deformation. The overall stiffness of the oral care mouthpiece can remain low. In specific embodiments of the invention, several rods can be connected to each other by supple links. The links can be formed by supple plastic or any elastic material. The size of the rods, or other rigid elements, can be set to achieve certain objectives. The rigid elements can be made larger to better connect the bristles together or made smaller to serve as less of an impediment to the deformation of the base.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. An oral care mouthpiece comprising:
a base shaped to a dental arch, wherein the base elastically deforms in response to pressure variations in the mouthpiece;
a set of one or more supports: (i) attached to the base; and (ii) that allow the base to elastically deform in response to the pressure variations in the mouthpiece;
a set of oral care elements: (i) attached to the set of one or more supports; and (ii) placed to transmit pressure to the dental arch when the base elastically deforms in response to the pressure variations in the mouthpiece;
wherein each support in the set of one or more supports comprises a canvas of woven fibers; and
wherein the oral care elements in the set of oral care elements are attached to the supports in the set of one or more supports by being woven into the canvas.

2. The oral care mouthpiece of claim 1, wherein:
the set of oral care elements is a set of cleaning elements.

3. The oral care mouthpiece of claim 2, wherein:
the set of cleaning elements comprise dental nylon bristles.

4. The oral care mouthpiece of claim 1, wherein:
the oral care elements are each between 3 millimetres and 6 millimetres long;
the oral care elements have a minimum cross section diameter of greater than 0.1 millimetres;
the oral care elements have a maximum cross section diameter of less than 0.2 millimetres; and
the Young modulus of the oral care elements is between 2,000 MPa and 5,000 MPa.

5. The oral care mouthpiece of claim 1, wherein:
the oral care elements have a moment less than $10^{-4}$ Newton meters; and
the moment is defined as the Young modulus in MPa multiplied by the quadratic moment of a minimum section of the oral care element in meters to the power of four, divided by the length of the oral care element.

6. The oral care mouthpiece of claim 1, wherein:
each support in the set of one or more supports is attached to the base using one of: (i) a mounting glue; (ii) a mounting resin; (iii) a mounting clip; (iv) over-moulding; and (v) a heat treatment.

7. The oral care mouthpiece of claim 1, wherein:
each support in the set of one or more supports is attached to the base using a flexible and biocompatible resin.

8. An oral care mouthpiece comprising:
an elastic base shaped to a dental arch;
a set of one or more supports: (i) attached to the base; and (ii) that allow the base to deform towards the dental arch and away from the dental arch;
a set of oral care elements attached to the set of one or more supports and placed to transmit pressure to the dental arch when the base deforms towards the dental arch and away from the dental arch;
wherein each support in the set of one or more supports comprises a canvas of woven fibers; and
wherein the oral care elements in the set of oral care elements are attached to the supports in the set of one or more supports by being woven into the canvas.

9. The oral care mouthpiece of claim 8, wherein:
the set of oral care elements is a set of cleaning elements.

10. The oral care mouthpiece of claim 9, wherein:
the set of cleaning elements comprise dental nylon bristles.

11. The oral care mouthpiece of claim 8, wherein:
the oral care elements are each between 3 millimetres and 6 millimetres long;
the oral care elements have a minimum cross section diameter of greater than 0.1 millimetres;
the oral care elements have a maximum cross section diameter of less than 0.2 millimetres; and
the Young modulus of the oral care elements is between 2,000 MPa and 5,000 MPa.

12. The oral care mouthpiece of claim 8, wherein:
the oral care elements have a moment less than $10^{-4}$ Newton meters; and
the moment is defined as the Young modulus in MPa multiplied by the quadratic moment of a minimum section of the oral care element in meters to the power of four, divided by the length of the oral care element.

13. The oral care mouthpiece of claim 8, wherein:
each support in the set of one or more supports is attached to the base using one of: (i) a mounting glue; (ii) a mounting resin; (iii) a mounting clip; (iv) over-moulding; and (v) a heat treatment.

14. The oral care mouthpiece of claim 8, wherein:

each support in the set of one or more supports is attached to the base using a flexible and biocompatible resin.

\* \* \* \* \*